US009944336B2

(12) United States Patent
Ogawa et al.

(10) Patent No.: US 9,944,336 B2
(45) Date of Patent: Apr. 17, 2018

(54) PART INSTALLATION MACHINE

(71) Applicant: MAZDA MOTOR CORPORATION, Hiroshima (JP)

(72) Inventors: Masaki Ogawa, Higashi-Hiroshima (JP); Shimpei Nagata, Hiroshima (JP); YingChuan Chen, Hiroshima (JP); Akira Okamoto, Hatsukaichi (JP); Masato Nishimura, Salamanca Guanajuato (MX); Akira Sekiraku, Hiroshima (JP); Naruyuki Suzuki, Higashi-Hiroshima (JP); Masaru Tanaka, Higashi-Hiroshima (JP); Katsuhiro Yamada, Hiroshima (JP); Takayuki Kamimoto, Hatsukaichi (JP); Tatsuyoshi Nishihara, Higashi-Hiroshima (JP); Shouji Kusuda, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 187 days.

(21) Appl. No.: 14/914,232

(22) PCT Filed: May 18, 2015

(86) PCT No.: PCT/JP2015/002493
§ 371 (c)(1),
(2) Date: Feb. 24, 2016

(87) PCT Pub. No.: WO2015/198522
PCT Pub. Date: Dec. 30, 2015

(65) Prior Publication Data
US 2016/0214668 A1   Jul. 28, 2016

(30) Foreign Application Priority Data
Jun. 25, 2014   (JP) .................... 2014-130603

(51) Int. Cl.
*B62D 65/18*   (2006.01)

(52) U.S. Cl.
CPC ......... *B62D 65/18* (2013.01); *Y10T 29/53365* (2015.01)

(58) Field of Classification Search
CPC ..................... B62D 65/18; Y10T 29/53365
See application file for complete search history.

(56) References Cited

U.S. PATENT DOCUMENTS

| | | | |
|---|---|---|---|
| 6,721,638 B2 * | 4/2004 | Zeitler | G05D 1/0261 180/408 |
| 7,350,613 B2 * | 4/2008 | Dehne | B62D 65/18 180/167 |

(Continued)

FOREIGN PATENT DOCUMENTS

| | | |
|---|---|---|
| CN | 1946513 A | 4/2007 |
| CN | 101678517 A | 3/2010 |

(Continued)

OTHER PUBLICATIONS

International Search Report and Written Opinion issued in Application No. PCT/JP2015/002493, dated Aug. 4, 2015.

*Primary Examiner* — John C Hong
(74) *Attorney, Agent, or Firm* — Studebaker & Brackett PC (57) ABSTRACT

A part installation machine, when having entered a part installation work area, operates a separation/coupling device to bring a drive carriage section and a part mounting carriage section from a coupled state into a separated state. The part installation machine also operates an engagement device such that the part mounting carriage section is engaged with a transfer system and transported by the transfer system. In this state, the part installation machine controls a travelling speed of the drive carriage section such that a relative (Continued)

position detected by a relative position detection device is maintained within a predetermined range.

12 Claims, 10 Drawing Sheets

(56) References Cited

U.S. PATENT DOCUMENTS

2007/0173113 A1 7/2007 Maruo et al.
2010/0028113 A1 2/2010 Tohyama et al.

FOREIGN PATENT DOCUMENTS

| | | |
|---|---|---|
| CN | 103481893 A | 1/2014 |
| JP | S58-179285 U1 | 11/1983 |
| JP | H09-290330 A | 11/1997 |
| JP | 4221619 B1 | 2/2009 |
| JP | 4958813 B2 | 6/2012 |

* cited by examiner

PART INSTALLATION MACHINE

TECHNICAL FIELD

The techniques disclosed herein relate to a part installation machine, and specifically relate to an installation machine which is for use in a vehicle assembly line for automobiles and which installs parts in the bodies of the automobiles while transferring the bodies by an overhead conveyor.

BACKGROUND ART

Vehicle assembly lines for automobiles, particularly those lines where parts, such as a power unit comprised of an engine and a transmission, and a suspension device, are installed in the bodies of the automobiles, have adopted a method in which the parts are transferred on a carriage, while each of the bodies is transferred by an overhead hanger, and these transfer movements are synchronized so that the parts are lifted and installed in the body from below. This method uses a self-propelled carriage having a driving system, and this carriage is self-propelled along a travel path laid on the floor. In general, the travel path of the self-propelled carriage is a looped path which starts from a part mounting area, passes through a part installation work area along the movement path of the hanger, and returns to the part mounting station. The self-propelled carriage and the hanger need to be mechanically or electrically synchronized in the part installation work area, as explained below.

In the mechanically-synchronized technique, as disclosed in Patent Document 1, the synchronization is achieved by mechanically coupling the carriage to a hanger hanging down from the overhead conveyor, via a cramp unit. In the electrically-synchronized technique, on the other hand, the synchronization is achieved by detecting a relative position of the self-propelled carriage to the hanger, and controlling the speed of the carriage.

Patent Document 2 discloses a self-propelled carriage comprised of a so-called automated guided vehicle (AGV) having a driving system, and a jig vehicle on which parts are mounted. These vehicles can be coupled to, and separated from, each other. The AGV and the jig vehicle are moved to near the upstream end of the conveyor-type transfer system, while being coupled to each other, and are separated from each other at this point, where the jig vehicle is engaged with the transfer system which will transfer the jig vehicle. In the course of transfer, the parts mounted on the jig vehicle are assembled into an assembly product. The AGV, on the other hand, is moved to near the downstream end of the transfer system earlier than the jig vehicle, and waits for the jig vehicle, on which the completed assembly product is now mounted, to arrive there. At this point, the AGV and this jig vehicle are coupled to each other again.

CITATION LIST

Patent Document

Patent Document 1: Japanese Patent No. 4221619
Patent Document 2: Japanese Patent No. 4958813

SUMMARY OF THE INVENTION

Technical Problem

However, although the known mechanically-synchronized technique uses mechanical engagement and hence provides high-accuracy synchronization, such a transfer system needs to be increased in size to ensure strength of the mechanically-engaged portion, because the carriage to be towed by the hanger includes a driving system and is relatively heavy in weight, and a heavy load is applied to the hanger. Turning to the known electrically-synchronized technique, no load is applied to the hanger, but the synchronization is less accurate than in the mechanically-synchronized technique. These problems are not limited to the case in which the transfer system is an overhead conveyor, i.e., the case in which parts are installed in the installation target body from below.

The techniques disclosed herein are intended to provide a part installation machine which allows for reducing a load applied to a transfer system transferring an installation target body, while ensuring desired accuracy in synchronization with the transfer system.

Solution to the Problem

To achieve the above objective, the part installation machine disclosed herein is configured as follows.

The techniques disclosed herein is directed to a self-propelled part installation machine on which a part is mounted in a part mounting area, and which travels while matching with a movement path of a transfer system in a part installation work area located downstream of the part mounting area, and is capable of installing the part in an installation target body transferred by the transfer system. The part installation machine includes a drive carriage section capable of traveling along a given travel path, a part mounting carriage section on which the part is mounted, and a separation/coupling device which brings the drive carriage section and the part mounting carriage section into a separated state or a coupled state. The drive carriage section is capable of transporting the part mounting carriage section, with the drive carriage section and the part mounting carriage section brought into the coupled state by the separation/coupling device. The part mounting carriage section is provided with an engagement device which engages the part mounting carriage section with the transfer system in the part installation work area. The drive carriage section is provided with a relative position detection device which detects a relative position between the drive carriage section and the part mounting carriage section in a travelling direction when the part mounting carriage section is in the separated state. The part installation machine is provided with a control device which, when the part installation machine enters the part installation work area, operates the separation/coupling device to bring the drive carriage section and the part mounting carriage section from the coupled state into the separated state, and operates the engagement device so that the part mounting carriage section is engaged with the transfer system and is transported by the transfer system, and in this state, the control device controls a travelling speed of the drive carriage section such that the relative position detected by the relative position detection device is maintained within a predetermined range.

The coupled state may be a drive coupling state in which the drive carriage section and the part mounting carriage section are coupled to each other so that the drive carriage section and the part mounting carriage section travel in an integral manner using a driving force of the drive carriage section. The separated state may be a non-drive coupling state in which the drive carriage section and the part mounting carriage section are coupled to each other in a manner that does not transmit the driving force of the drive carriage section to the part mounting carriage section.

The part installation machine may include a looped travel path, and after recoupling of the drive carriage section and the part mounting carriage section by the separation/coupling device, the part installation machine may be carried into the part mounting area again.

The transfer system may have, in the part mounting area, a plurality of suspension sections each of which hangs the installation target body, and the part installation machine may have a part lift mechanism which lifts the part from under the installation target body hanging on the suspension section to install the part in the installation target body.

In the case where the part is installed in a rear portion, in a transfer direction, of the installation target body, the drive carriage section may transport the part mounting carriage section by towing a front side, in the transfer direction, of the part mounting carriage section. In the case where the part is installed in a front portion, in the transfer direction, of the installation target body, the drive carriage section may transport the part mounting carriage section by pushing a rear side, in the transfer direction, of the part mounting carriage section.

Advantages of the Invention

The above configurations of the techniques disclosed herein have the following advantages.

The part installation machine is provided with a control device which, when the part installation machine enters a part installation work area, operates a separation/coupling device to bring a drive carriage section and a part mounting carriage section from a coupled state into a separated state, and operates an engagement device so that the part mounting carriage section is engaged with a transfer system and is transported by the transfer system, and in this state, the control device controls a travelling speed of the drive carriage section such that a relative position detected by a relative position detection device is maintained within a predetermined range. This allows for reducing a load applied to the transfer system transferring an installation target body, while ensuring desired accuracy in synchronization with the transfer system. Further, since the drive carriage section and the part mounting carriage section are kept at a relatively short distance from each other, the drive carriage section and the part mounting carriage section do not interfere with another installation target body which precedes.

The separated state is a non-drive coupling state in which the drive carriage section and the part mounting carriage section are coupled to each other in a manner that does not transmit the driving force of the drive carriage section to the part mounting carriage section. This allows for shortening the time for separating the drive carriage section and the part mounting carriage section from each other, and recoupling the drive carriage section and the part mounting carriage section to each other. As a result, the transfer takt time in the mass production line is reduced, and the productivity can therefore be increased.

The part installation machine includes a looped travel path, and the part installation machine is carried into the part mounting area again, after the recoupling by the separation/coupling device. This allows for installing parts in a large number of installation target bodies by repeatedly using a small number of part installation machines.

The transfer system has, in the part mounting area, a plurality of suspension sections each hanging the installation target body, and the part is lifted from under the installation target body hanging from the suspension section, and is installed in the installation target body. This allows for installing a part in an installation target body transferred by a so-called ceiling transfer system, using a part installation machine which is a so-called floor transfer system.

In the case where the part is installed in a rear portion, in a transfer direction, of the installation target body, the drive carriage section transports the part mounting carriage section by towing a front side, in the transfer direction, of the part mounting carriage section, and in the case where the part is installed in a front portion, in the transfer direction, of the installation target body, the drive carriage section transports the part mounting carriage section by pushing a rear side, in the transfer direction, of the part mounting carriage section. This enables not only the part mounting carriage section, but also the drive carriage section, to travel under the installation target body in synchronization with the transfer system. This allows for providing, between the part installation machines for installing parts in the installation target bodies arranged next to each other in the transfer direction, a sufficient empty space through which the worker can move to the opposite side of the installation target body with respect to the transfer direction. The efficiency of installation by workers is therefore further improved.

DESCRIPTION OF EMBODIMENTS

Figure 1:
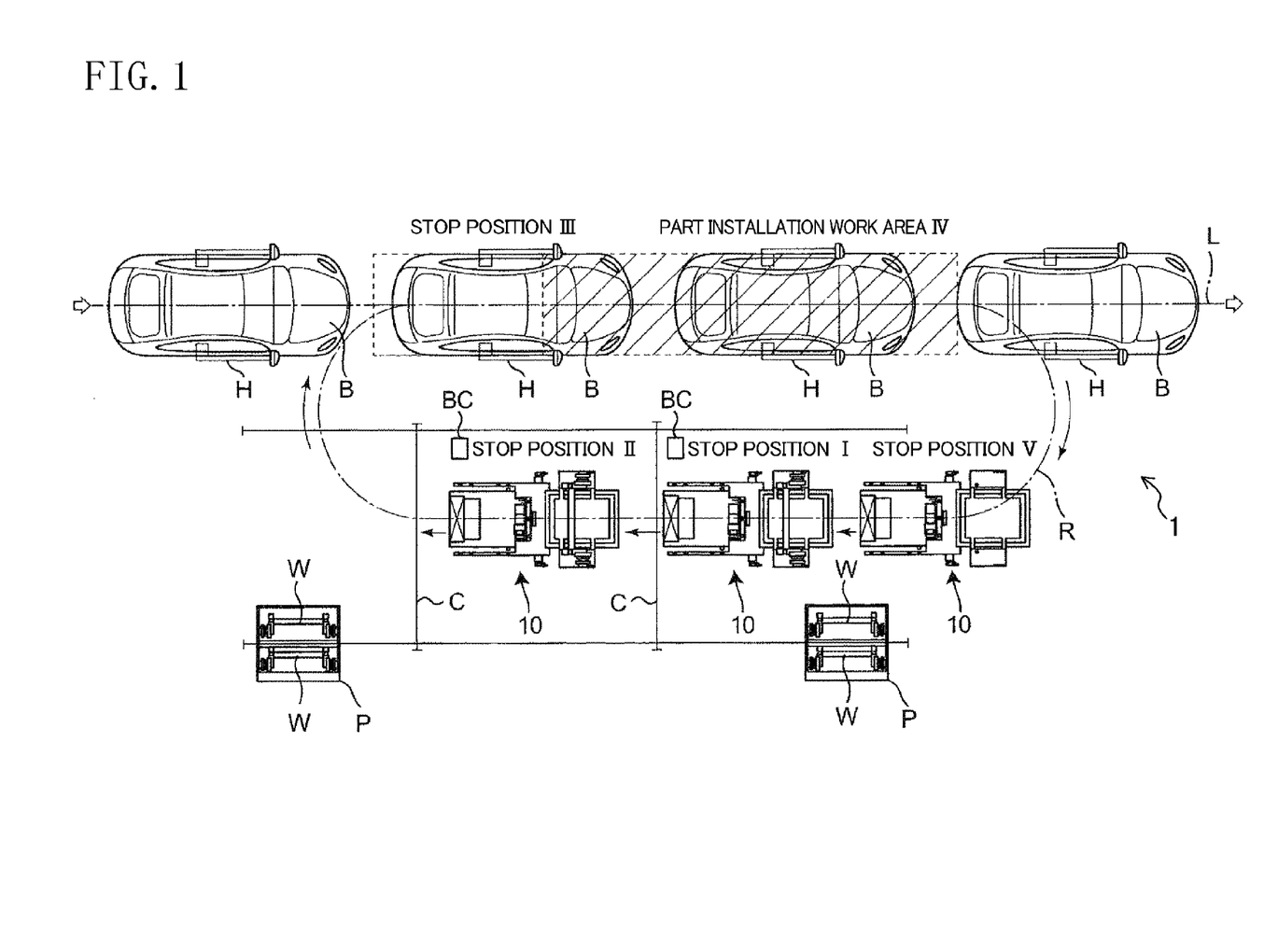
FIG. 1 is a plan view illustrating part of a vehicle assembly line in which part installation machines are used.

First, a part installation machine 10 according to an embodiment of the techniques disclosed herein will be described with reference to FIGS. 1-5. FIG. 1 is a plan view illustrating part of a vehicle assembly line 1 where the part installation machines 10 are used.

As illustrated in FIG. 1, the vehicle assembly line 1 in a car production facility is provided with an overhead conveyor (only hangers H are shown in the drawing) and the part installation machines 10. The overhead conveyor hangs car bodies B, using a plurality of hangers H which move along a travel rail L attached on the ceiling, and thereby successively transfers the car bodies B. The part installation machines 10 travel on the floor along a looped travel line R made of magnetic tape laid on the floor.

The travel line R of the part installation machines 10 sequentially runs through, from its upstream side to its downstream side, a stop position I, a stop position II, a stop position III, a part installation work area IV, and a stop position V, where the part installation machines 10 can make a temporary stop. As illustrated in FIG. 1, part of the travel line R of the part installation machines 10 overlaps the travel rail L of the hangers H in plan view.

The stop position I, which is a part mounting area, is provided with a simple portal crane C that is used to mount a part W on the part installation machine 10. A worker picks up an intended part W from a plurality of parts W that are loaded on palettes P, using the simple crane C, and mounts the part W on the part installation machine 10 making a temporary stop at the stop position I. Two simple cranes C are used in the present embodiment, which share a pair of travel rails arranged parallel to the travel line R of the part installation machines 10. The simple cranes C are configured to be able to pick up the parts W independently from each other unless they interfere with each other. Different parts W, such as rear suspension mechanisms for a front-wheel-drive car and a four-wheel-drive car, may be loaded on each of the palettes P, depending on car model.

Each of the stop positions I and II is provided with a battery charger BC for charging the part installation machines 10. The part installation machines 10 can be charged either automatically or manually while making a temporary stop at the stop position I or the stop position II.

The stop position III is located at the upstream end of the overlapped portion of the travel line R with the travel rail L of the hangers H. In the part installation work area IV located downstream of the stop position III, the part installation machine 10 travels along the travel rail L of the hangers H. Thus, there is provided, beside the part installation work area IV, a work space (not shown) for workers to move while installing the parts W in the car bodies B transferred by the hangers H.

Figure 4:
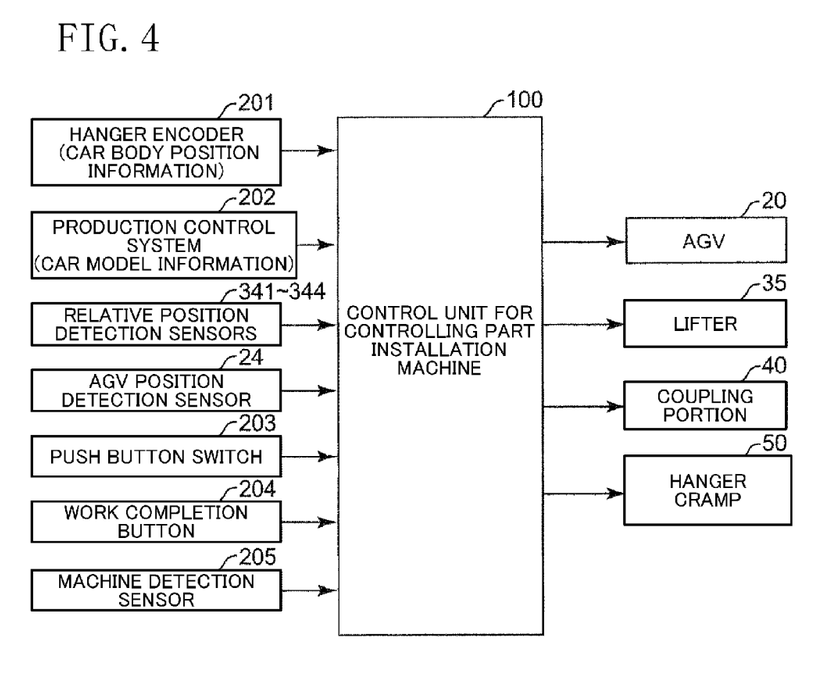
FIG. 4 is a block diagram showing a system configuration of the part installation machine.

As shown in FIG. 4, the overhead conveyor in the present embodiment is provided with a hanger encoder 201, which detects a rotational speed of a drive motor that drives the overhead conveyor, to control a transfer speed of the hangers H based on an output signal of the hanger encoder 201. The overhead conveyor and the part installation machines 10 are comprehensively controlled by a production control system 202 comprised of a computer. For example, information, such as information about the car models of the car bodies B being transferred by the respective hangers H, is controlled on a real-time basis.

Further, in the present embodiment, each of the stop position I where the parts W are mounted on the part installation machine 10 and the part installation work area IV is provided with a work completion button 204 manually operated by the worker to notify the completion of mounting of the parts W and the installation of the parts W. Each of the stop positions I and II is provided with a machine detection sensor 205 which automatically detects whether the part installation machine 10 is making a stop or not in the respective positions.

Figure 2:
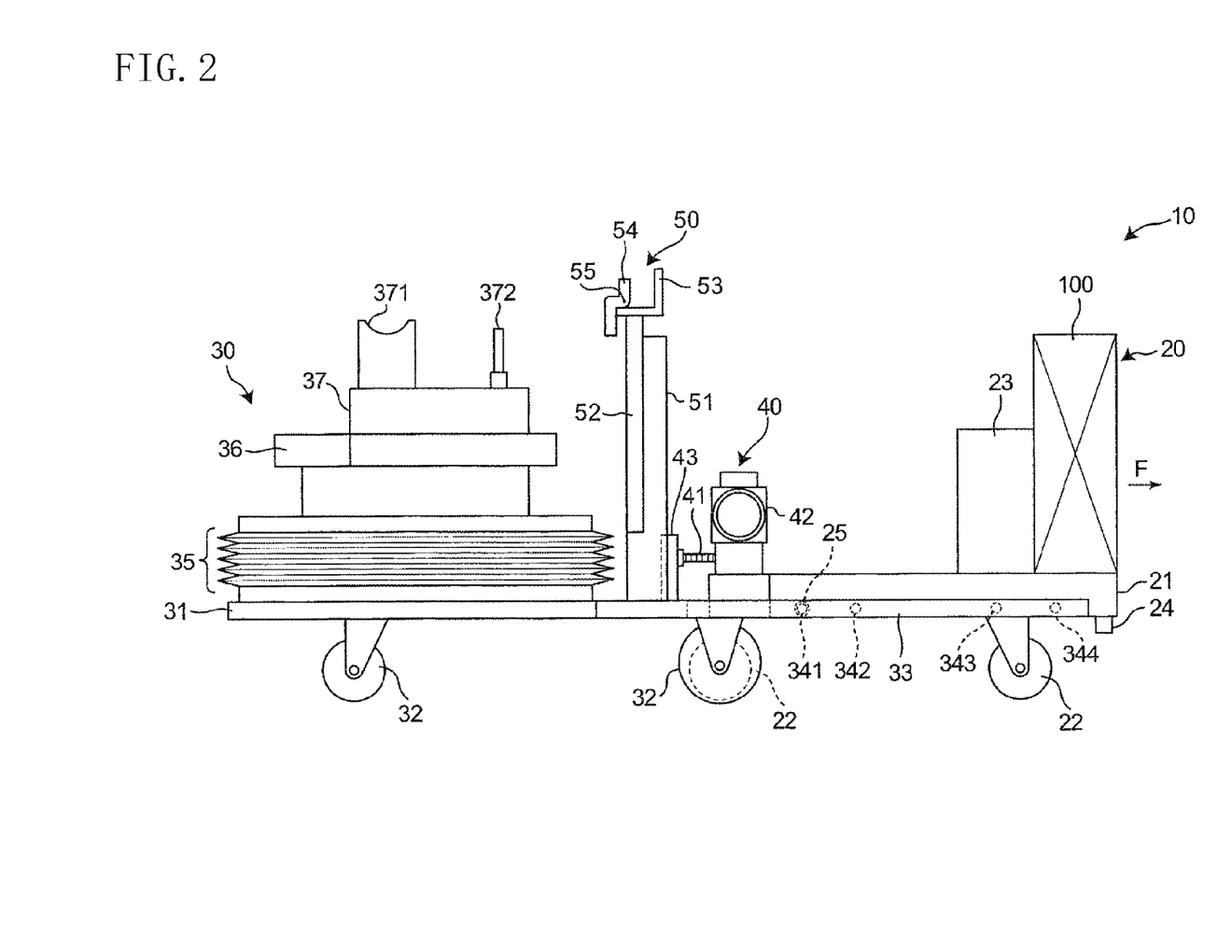
FIG. 2 is a side view illustrating the part installation machine.
Figure 3:
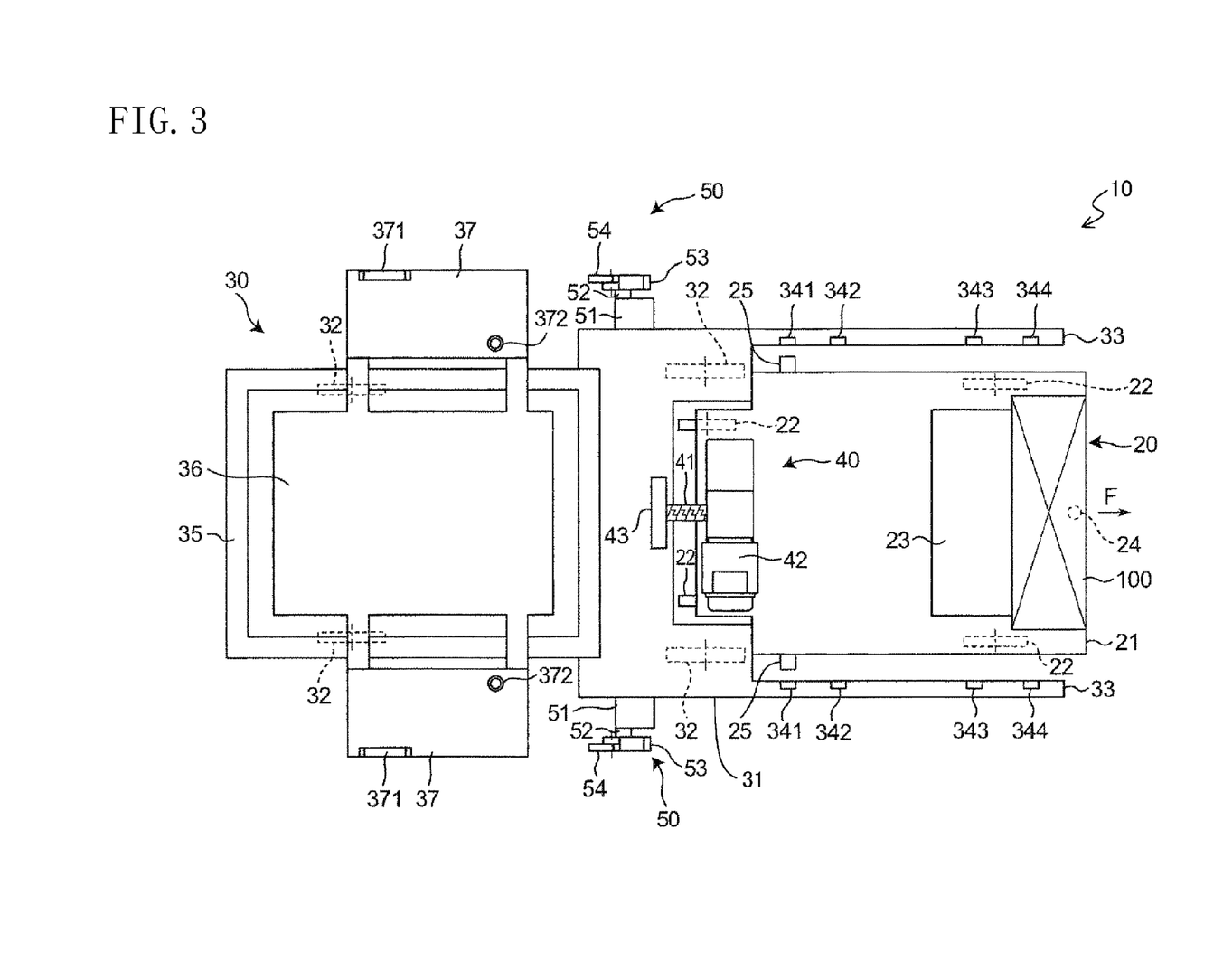
FIG. 3 is a plan view of the part installation machine.

Now, a specific configuration of the part installation machine 10 will be explained with reference to FIGS. 2 and 3. FIGS. 2 and 3 are a side view and a plan view of the part installation machine 10, respectively.

As illustrated in FIGS. 2 and 3, the part installation machine 10 has an AGV 20 which is a self-propelled drive carriage moving along the travel line R, a mounting carriage 30 which can carry and transport the parts W, and a coupling portion 40 which brings the AGV 20 and the mounting carriage 30 into a drive coupling state or a non-drive coupling state.

The "drive coupling state" is a state in which the AGV 20 and the mounting carriage 30 are coupled to each other by the coupling portion 40 in such a manner that allows the AGV 20 and the mounting carriage 30 to travel in an integral manner using a driving force of the AGV 20. The "non-drive coupling state" is a state in which the AGV 20 and the mounting carriage 30 are coupled to each other by the coupling portion 40 in such a manner that does not transmit the driving force of the AGV 20 to the mounting carriage 30. This means that the AGV 20 is able to transport the mounting carriage 30 by towing or pushing the mounting carriage 30 via the coupling portion 40 in the drive coupling state, whereas the AGV 20 is not able to transport the mounting carriage 30 via the coupling portion 40 in the non-drive coupling state.

The AGV 20 has a flat plate-like base 21, and four wheels 22 rotatably attached to the bottom face of the base 21 and supporting the base 21. In the present embodiment, the pair of wheels 22 arranged nearest to the front side of the vehicle (Arrow F) in the lateral direction are configured to be rotated by a drive motor not shown. The base 21 has, on its top face, a control unit 100 which controls the part installation machine 10 as a whole, and a rechargeable battery 23 which supplies electric power to the drive motor, the control unit 100, etc.

The AGV 20 is also provided with an AGV position detection sensor 24 which detects a current position of the AGV 20 from the travel line R, and detection targets 25 each made of a metal plate projecting from a side face of the base 21.

The mounting carriage 30 has a flat plate-like base 31, and four wheels 32 rotatably attached to a the bottom face of the base 31 and supporting the base 31. The front end of the base 31 is provided with a pair of guide members 33 arranged in the lateral direction and extending in the travelling direction of the mounting carriage 30. Each of the guide members 33 is provided with relative position detection sensors 341-344 comprised of capacitance type proximity sensors. The relative position detection sensors 341-344 are arranged in the longitudinal direction of the guide members 33 with a predetermined interval between the sensors 341-344. Detecting sections of the respective relative position detection sensors 341-344 face inward in the lateral direction, that is, face the side face of the base 21 of the AGV 20 positioned between the left and right guide members 33.

The degree of projection of each of the detection targets 25 from the side face of the base 21 is adjusted so that the relative position detection sensors 341-344 of the AGV 20 can detect the detection target 25 when the detection target 25 faces the relative position detection sensors 341-344. The relative position between the AGV 20 and the mounting carriage 30 in the travelling direction can be determined, based on which of the relative position detection sensors 341-344 has detected the detection target 25. Specifically, as illustrated in FIGS. 2 and 3, the relative position detection sensor 341 detects the detection target 25 when the AGV 20 and the mounting carriage 30 are the closest to each other. As the AGV 20 moves away from the mounting carriage 30 from this state, the relative position detection sensors 342, 343 and 344 sequentially detect the detection target 25.

The base 31 has, on its top face, a lifter 35 which lifts a part W to install it in the car body B from below. The lifter 35 is configured to be able to move up and down by being manually controlled by the worker. Specifically, the part installation machine 10 is provided with a push button switch 203 which the worker manually operates to move up and down the lifter 35. In the present embodiment, the outer circumference of the lifter 35 is covered with an accordion-folded cover for safety of the worker.

A support table 36 is provided on the upper side of the lifter 35. A detachable support jig 37 which supports the part W is provided on the support table 36. In the present embodiment, the support jig 37 is dedicated to supporting a rear suspension mechanism W as one of the parts W, and is provided with a pair of recessed portions 371 arranged in the lateral direction which support the outer peripheral surfaces of the wheel support members 308 (see FIG. 6 if necessary) of the rear suspension mechanism W, and a pair of rods 372 arranged in the lateral direction which support trailing arms 302 of the rear suspension mechanism W. If the parts W to be handled include a plurality of types, support jigs 37 dedicated to the respective parts W may be prepared and replaced on the support table 36 according to the part W to be installed.

A hanger cramp 50 (hereinafter referred to as a "cramp 50") which is configured to be engaged with the hanger H in the part installation work area IV, is provided on the base 31 of the mounting carriage 30 and located forward of the lifter 35. The cramp 50 has a vertical drive portion 51 having, in its vertically-extending casing, a mechanism (not shown) that allows for reciprocating motion in the vertical direction, an ascent/descent member 52 that is caused to move up and down by the vertical drive portion 51, an engaging claw 53 provided on the top end of the ascent/descent member 52 so as to be capable of being engaged with the hanger H, and a stopper 54 which limits a relative movement of the hanger H away from the engaging claw 53 to maintain the engagement of the engaging claw 53 with the hanger H. A pivot 55 extending in the lateral direction is provided on the top end of the ascent/descent member 52. The stopper 54 is capable of swinging only in the travelling direction, using this pivot 55 as a swing fulcrum. Further, the center of gravity of the stopper 54 is located at a lower portion of the pivot 55 so that the stopper 54 can be held vertically upright in the natural state.

With this configuration, the cramp 50 is engaged with the hanger H in the following manner first, the stopper 54 held vertically upright is tilted in the travelling direction by being pushed by the hanger H; the hanger H becomes out of contact with the stopper 54 as it makes further movement in the travelling direction; and then the stopper 54 is held vertically upright again. As a result, the relative movement of the hanger H is limited between the engaging claw 53 and the stopper 54 opposed to each other.

The coupling portion 40 has a Zip Chain 41 (registered trademark) comprised of two chains which lock together like a zipper from their tip end portions to form a single, strong column, and a coupling portion drive unit 42 having: a pair of sprockets (not shown) arranged in the lateral direction which respectively reel the two separated chains unlocked from the base end portion of the Zip Chain 41; and a drive motor which rotates the sprockets. The tip end portion of the Zip Chain 41 is fixed to an attachment bracket portion 43 provided at a rear portion of the base 31 of the mounting carriage 30. The coupling portion drive unit 42, which is located near the base end portion of the Zip Chain 41, is fixed to a rear portion of the base 21 of the AGV 20.

This configuration of the coupling portion 40 allows for pulling and pushing the bracket portion 43 by the tip end portion of the Zip Chain 41, using driving force of the coupling portion drive unit 42. When the tip end portion of the Zip Chain 41 pushes the attachment bracket portion 43, the AGV 20 and the mounting carriage 30 moves away from each other in the front-back direction. By contrast, when the tip end portion of the Zip Chain 41 pulls the attachment bracket portion 43, the AGV 20 and the mounting carriage 30 are brought closer to each other in the front-back direction.

Now, a system configuration of the part installation machine 10 will be described with reference to FIG. 4. FIG. 4 is a block diagram showing the system configuration of the part installation machine 10.

As shown in FIG. 4, the control unit 100 which controls the part installation machine 10 is configured to receive signals from the hanger encoder 201, the production control system 202, the relative position detection sensors 341-344, the AGV position detection sensor 24, the push button switch 203, the work completion button 204, the machine detection sensor 205, etc.

The control unit 100 is capable of obtaining positional information of each of the car bodies B transported by the hangers H, based on an input signal from the hanger encoder 201, and car model information of the respective car bodies B, based on an input signal from the production control system 202.

The control unit 100 operates based on the aforementioned input signals, and outputs control signals to the AGV 20, the lifter 35, the coupling portion 40, and the cramp 50 to control these elements.

With this system configuration, the control unit 100 operates the coupling portion 40, when the part installation machine 10 enters the part installation work area IV, to bring the AGV 20 and the mounting carriage 30 from the drive coupling state into the non-drive coupling state.

Now, the drive coupling state and the non-drive coupling state of the part installation machine 10 will be described with reference to FIG. 5. The upper and lower drawings of FIG. 5 are side views generally illustrating the drive coupling state and the non-drive coupling state, respectively, of the part installation machine 10.

Figure 5:
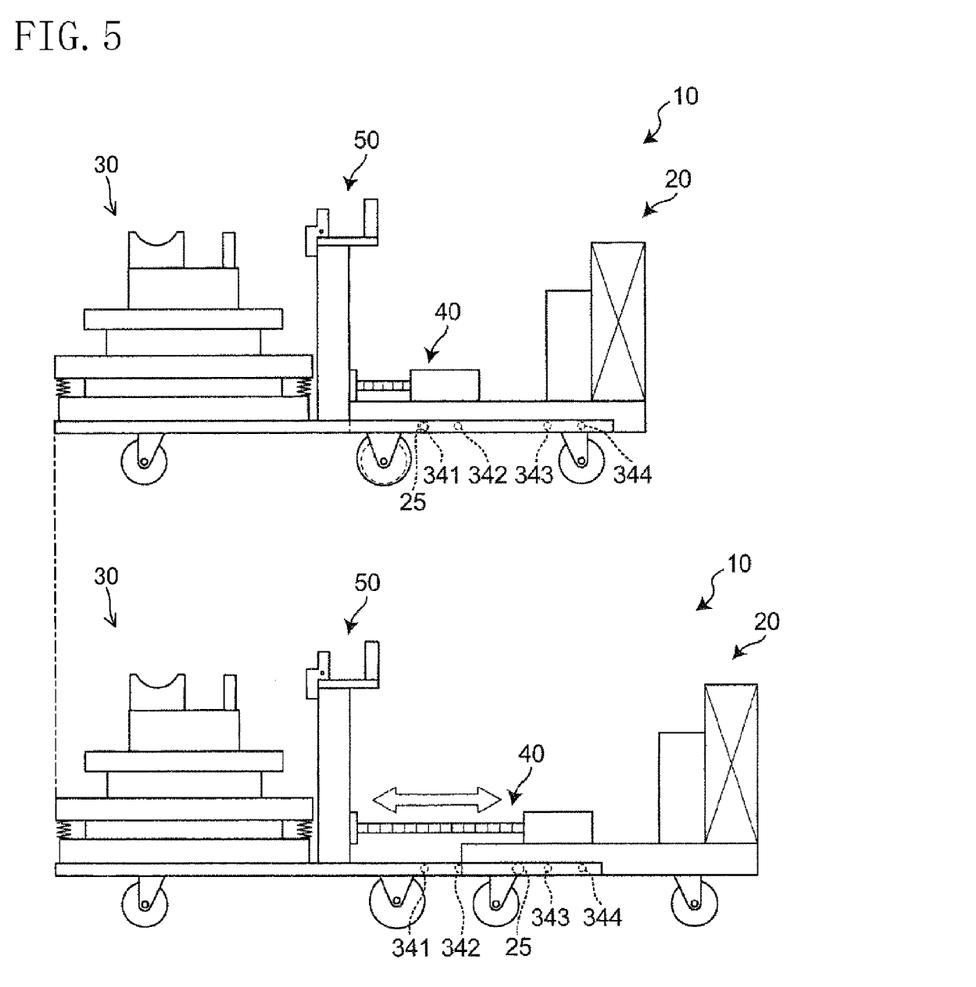
FIG. 5 is a side view for generally illustrating a drive coupling state and a non-drive coupling state of the part installation machine.

As illustrated in the upper drawing of FIG. 5, when the relative position detection sensor 341 of the mounting carriage 30 is at a position where the sensor 341 faces the detection target 25 of the AGV 20, that is, when the AGV 20 and the mounting carriage 30 are the closest to each other, the part installation machine 10 is brought into the drive coupling state by coupling the coupling portion 40, that is, by locking the Zip Chain 41.

As illustrated in FIG. 5, the part installation machine 10 is brought into the non-drive coupling state by decoupling the coupling portion 40, that is, by unlocking the Zip Chain 41. After that, only the AGV 20 is moved forward until the detection target 25 of the AGV 20 is positioned between the relative position detection sensors 342 and 343 of the mounting carriage 30. In this state, the mounting carriage 30 is engaged with the hanger H at the cramp 50, and consequently moves with the hanger H in a synchronized manner. The travelling speed of the AGV 20 is controlled such that the detection target 25 is kept between the relative position detection sensors 342 and 343.

Figure 6:
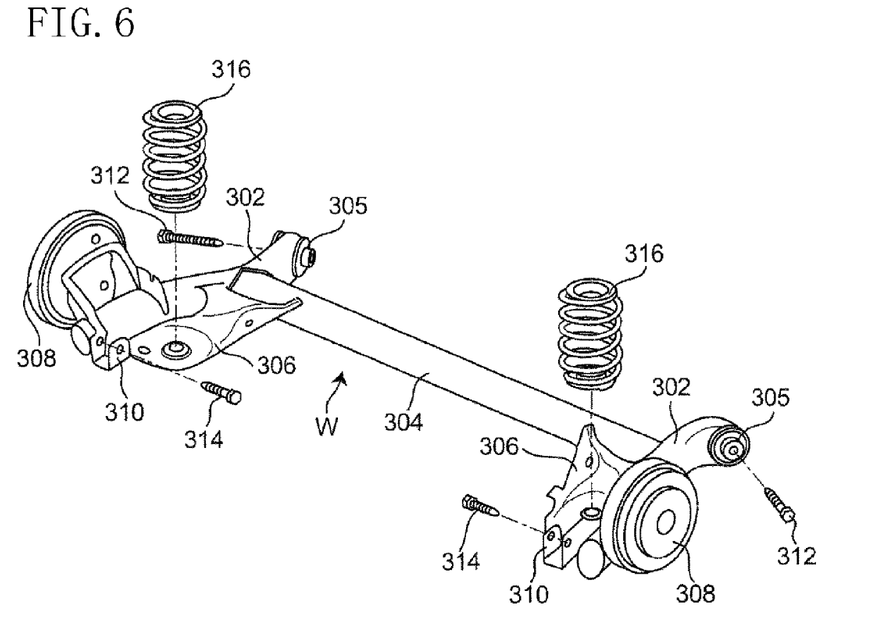
FIG. 6 is an exploded perspective view illustrating a configuration of a rear suspension mechanism.

Now, the rear suspension mechanism W to be installed in the car body B by the part installation machine 10 will be described with reference to FIG. 6. FIG. 6 is an exploded perspective view illustrating a specific configuration of the rear suspension mechanism W.

As illustrated in FIG. 6, the rear suspension mechanism W of the present embodiment is a so-called torsion beam suspension mechanism. Specifically, the rear suspension mechanism W has: a pair of trailing arms 302 arranged in the lateral direction and extending in the longitudinal direction of the vehicle; a torsion beam 304 extending in between the trailing arms 302 in the width direction of the vehicle and coupling the trailing arms 302; a pair of arm bushes 305 arranged in the lateral direction and pivoting front sides of the trailing arms 302 to the car body B; spring seats 306 each welded to an associated one of the trailing arms 302; wheel support members 308 each attached to an rear outer portion, in the width direction of the vehicle, of an associated one of the trailing arms 302; damper brackets 310 each provided at a rear portion of an associated one of the spring seats 306; first pivots 312 each inserted in an associated one of the arm bushes 305; second pivots 314 each inserted in an associated one of the damper brackets 310; and coil springs 316 each intervening between the top face of an associated one of the spring seats 306 and the rear side frame (not shown) of the car body B.

In the present embodiment, each of the arm bushes 305 is configured such that the first pivot 312 can be inserted therein from the outside to the inside of the vehicle in a direction slightly inclined to the rear side of the vehicle. Further, each of the damper brackets 310 is configured such that the second pivot 314 can be inserted therein from inside to outside the vehicle.

Figure 7:
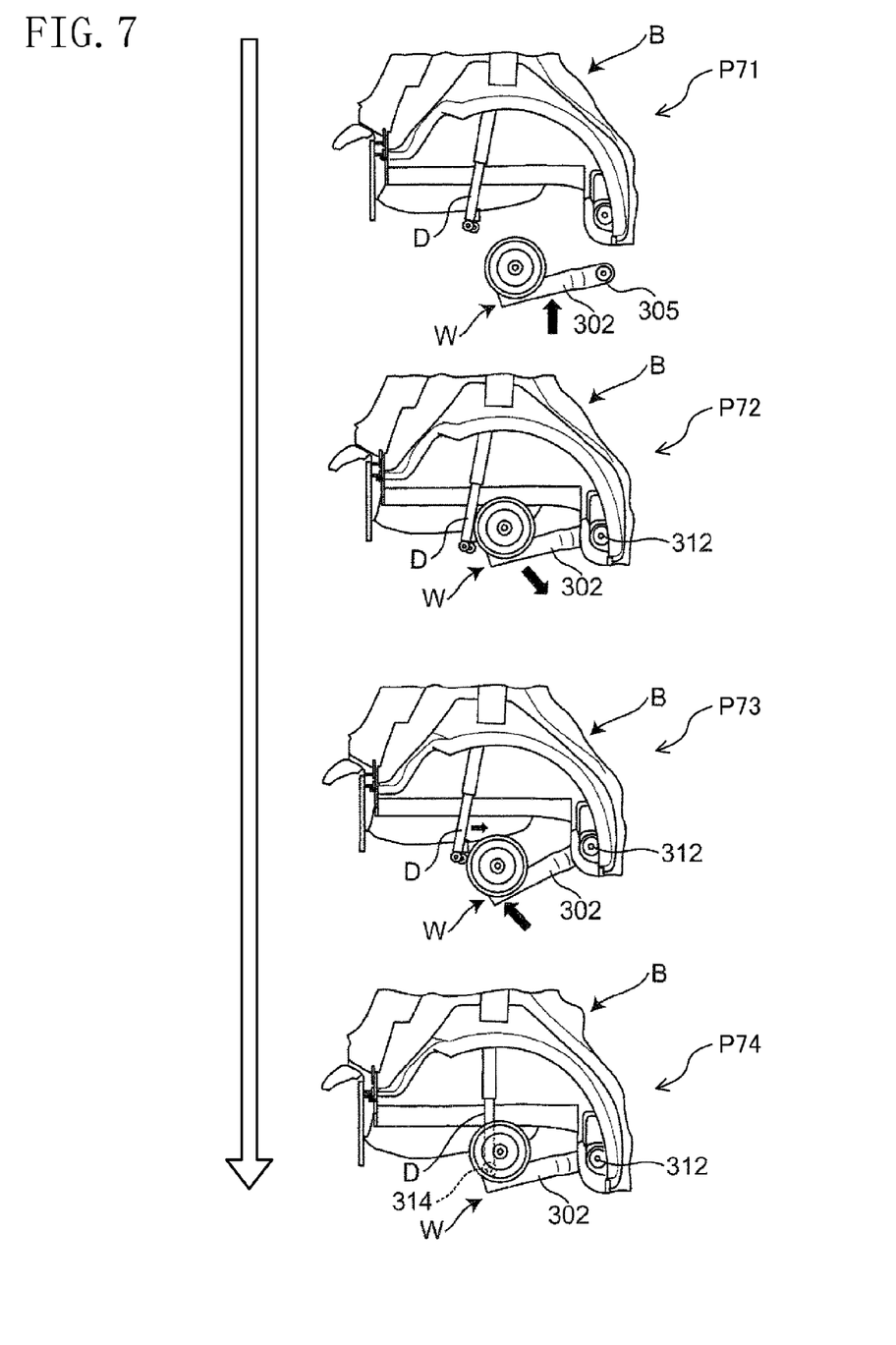
FIG. 7 is a side view for generally illustrating a process of installing the rear suspension mechanism.

Now, installation of the aforementioned rear suspension mechanism W will be described with reference to FIG. 7. FIG. 7 is a side view generally illustrating a process of installing the rear suspension mechanism W by a worker in the part installation work area IV. The installation of the rear suspension mechanism W proceeds in the order of P71, P72, P73 and P74 as indicated by white arrow in FIG. 7.

First, as illustrated in Process P71 of FIG. 7, the worker operates the push button switch 203 to raise the lifter 35 on which the rear suspension mechanism W is mounted, thereby lifting the rear suspension mechanism W from under the car body B held by the hanger H.

Next, as illustrated in Process P72 of FIG. 7, the worker operates the push button switch 203 to adjust the positions of the arm bushes 305 in the vertical direction, and inserts the first pivots 312, from the outside of the car body B, into the arm bushes 305 arranged inside the car body B.

Next, as illustrated in Process P73 of FIG. 7, the worker operates the push button switch 203 to lower the lifter 35, thereby lowering the rear suspension mechanism W with the first pivots 312 serving as swing fulcrums, and widening the gap between each of the spring seats 306 (not shown in FIG. 7) and the rear side frame (not shown) of the car body B. In this state, the coil springs 316 are placed to intervene between the respective spring seats 306 and the rear side frame of the car body B.

Lastly, as illustrated in Process P74 of FIG. 7, the worker operates the push button switch 203 to raise the lifter 35, thereby raising the rear suspension mechanism W with the first pivots 312 serving as the swing fulcrums, and sandwiching the coil springs 316 between the rear side frame of the car body B and the respective spring seats 306. In this state, each of dampers D, of which the upper end is supported on the car body B side so as to be capable of swinging with the upper end serving as a swing fulcrum, is swung in the forward direction of the vehicle, and the second pivots 314 are inserted, from the inside to the outside of the car body B, into the respective damper brackets 310 and lower end portions of the dampers D as well. As a result, the lower end portions of the respective dampers D can be rotatably attached, via the second pivots 314, to the damper brackets 310 (not shown in FIG. 7) of the raised rear suspension mechanism W.

Following the above work process, the worker finishes installing the rear suspension mechanism W in the car body B. As it is well known, the rear suspension mechanism W installed in the manner as described above allows for vertical movements of the wheels, when the wheels receive vertical impact from the road surface, because the trailing arms 302 extending in the front-back direction of the vehicle swing up and down with the arm bushes 305 serving as swing fulcrums. Vertical displacement of the trailing arms 302 during the vertical movements of the wheels is reduced by the dampers D.

Figure 8:
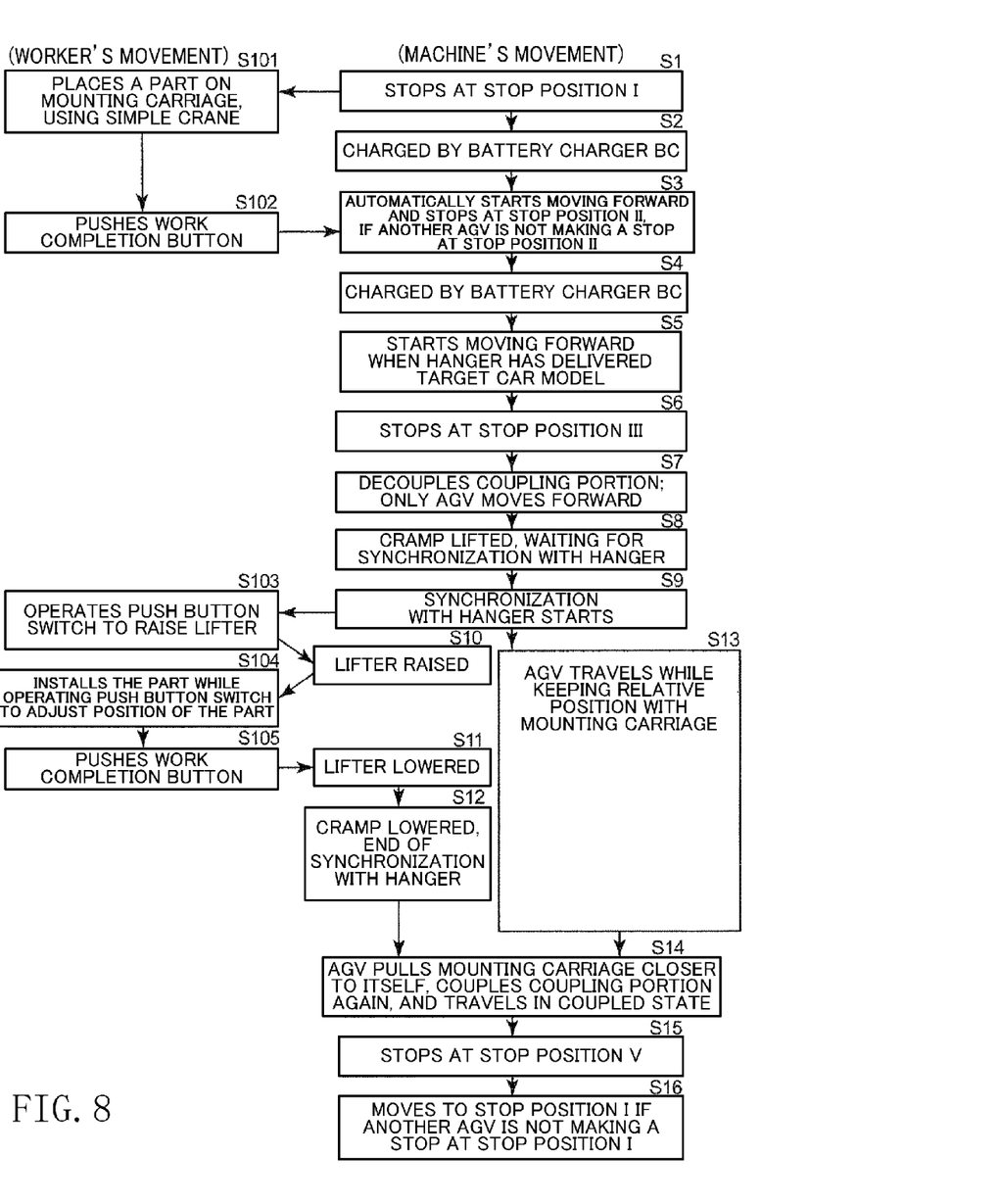
FIG. 8 is a flow chart showing the operational processes of the part installation machine and the worker.
Figure 9:
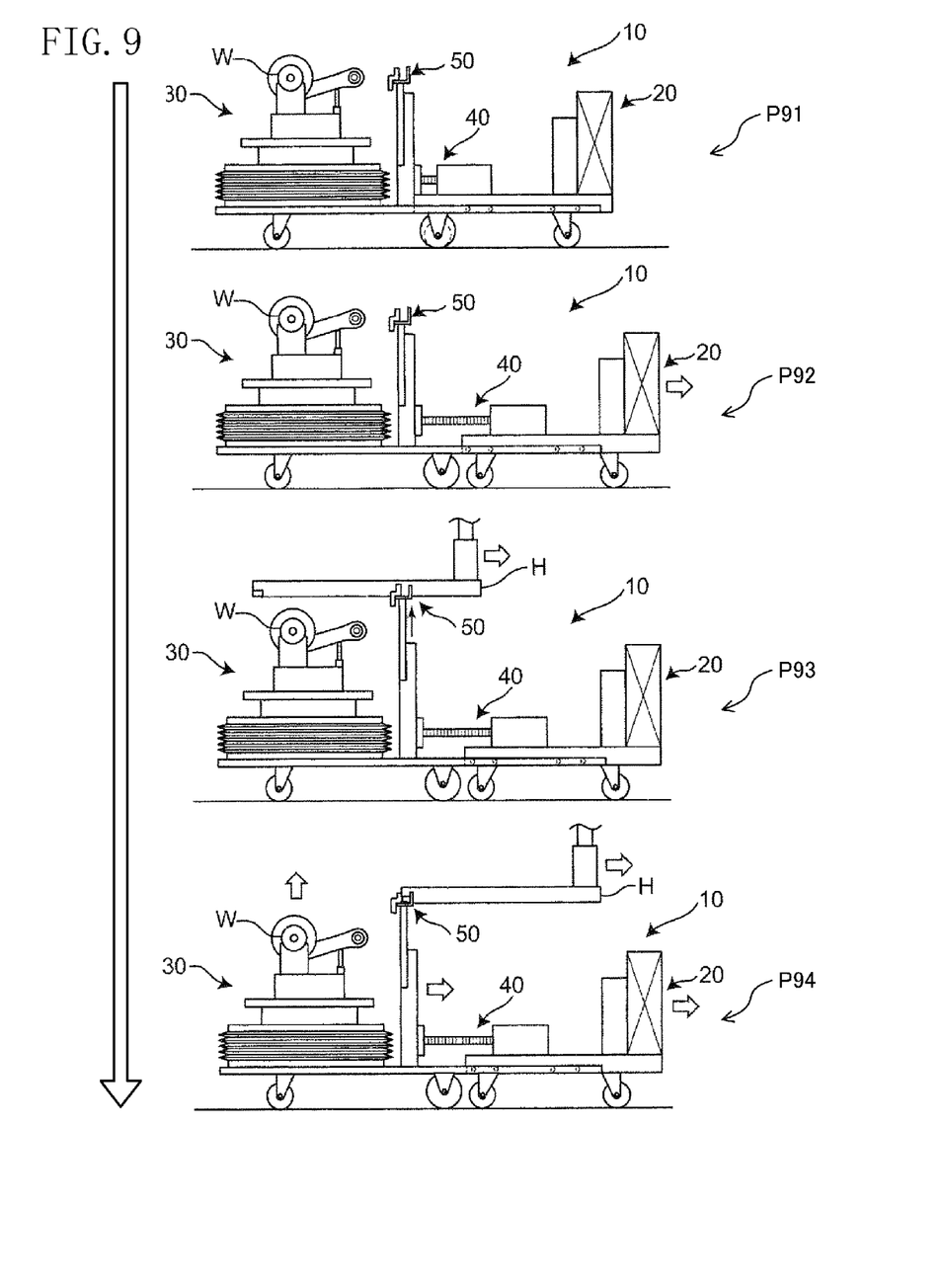
FIG. 9 generally illustrates side views of the part installation machine in the first half of the operational process.
Figure 10:
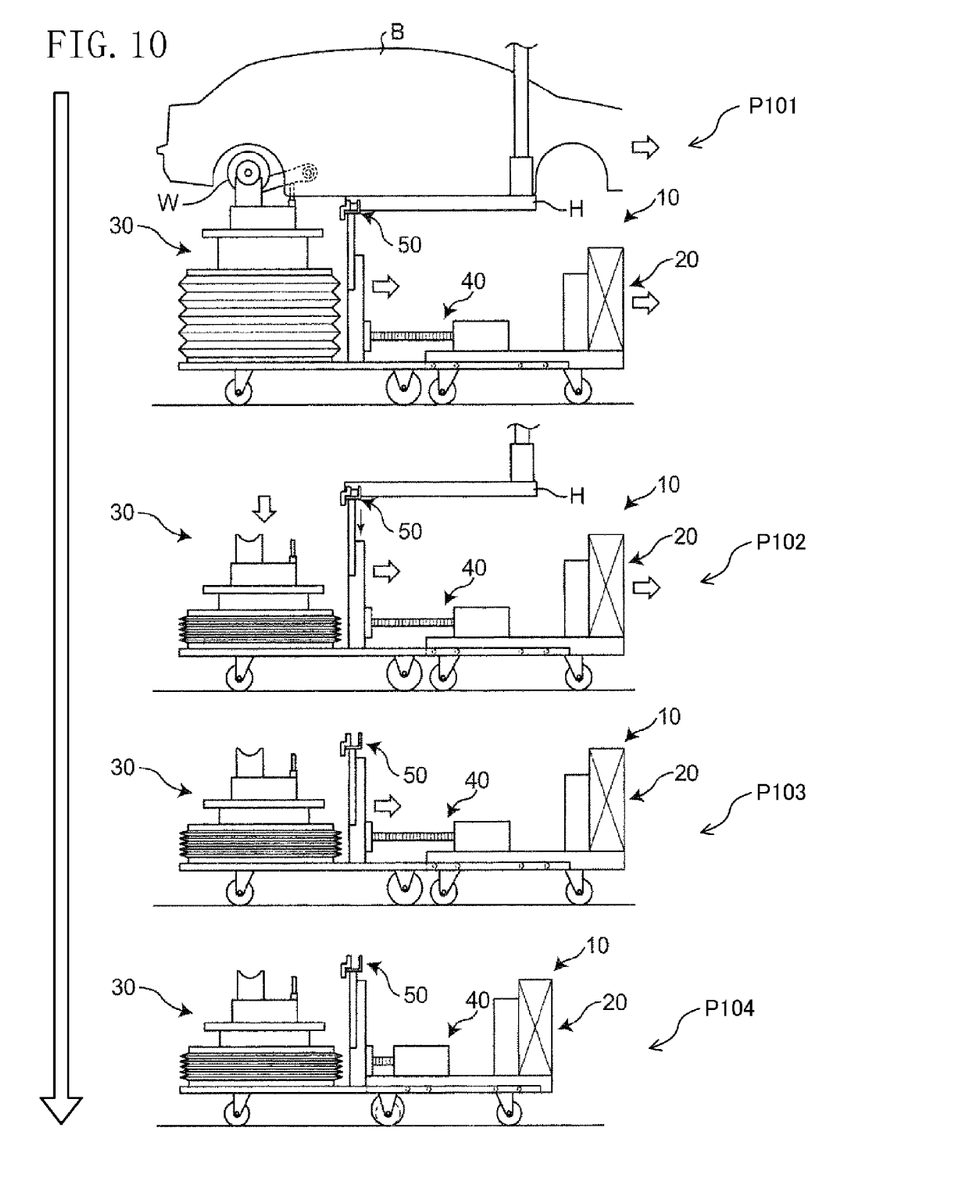
FIG. 10 generally illustrates side views of the part installation machine in the second half of the operational process.

Now, a process of installing the rear suspension mechanism W will be described based on the process shown in FIG. 8, with appropriate reference to FIGS. 9 and 10. FIG. 8 is a flow chart showing the operational processes of the part installation machine 10 and the worker. FIGS. 9 and 10 generally illustrate side views of the first half (i.e., Process P91 to Process P94) and the second half (i.e., Process P101 to Process P104), respectively, of the operational process of the part installation machine 10. Note that the car body B is not shown in Processes P93 and P94 in FIG. 9 and Process P102 in FIG. 10.

First, the part installation machine 10 stops at the stop position I, while being in the drive coupling state (Step S1).

Next, the worker picks up, from a palette P, a part W to be installed in the car body B using the simple crane C, and places this part W on the mounting carriage 30 of the part installation machine 10 which is making a stop at the stop position I, as shown in Process P91 of FIG. 8 (Step S101). Meanwhile, the part installation machine 10 charges, if necessary, the battery 23 of the AGV 20 using the battery charger BC provided at the stop position I (Step S2).

After finishing placing the part W, the worker pushes the work completion button 204 (Step S102). In response to the input signal from the work completion button 204 notifying the completion of the work, the part installation machine 10 detects, from an input signal from the machine detection sensor 205, whether or not another part installation machine 10 which precedes is making a stop at the stop position II on the downstream side. If another part installation machine 10 is not making a stop, the part installation machine 10 automatically starts moving forward to the stop position II, where it stops (Step S3). The part installation machine 10 stays there while charging, if necessary, the battery 23 of the AGV 20 using the battery charger BC provided at the stop position II (Step S4).

Next, if the part installation machine 10 determines, based on the input signals from the hanger encoder 201 and the production control system 202, that the hanger H has delivered a car body B of a target model to the part installation work area IV, the part installation machine 10 automatically starts moving forward (Step S5) to make a stop at the stop position III (Step S6).

Next, the part installation machine 10 decouples the coupling portion 40, and only the AGV 20 is moved forward until the coupling state is brought into the non-drive coupling state as shown in Process P92 in FIG. 9 (Step S7).

Next, as shown in Process P93 of FIG. 9, the part installation machine 10 stays, with the cramp 50 raised to the height at which the cramp 50 and the hanger H can be engaged with each other (Step S8).

Next, as shown in Process P94 of FIG. 9, once the cramp 50 is engaged with the hanger H having been transferred to the site, the mounting carriage 30 starts moving in synchronization with the movement of the hanger H (Step S9).

Next, the worker operates the push button switch 203 to raise the lifter 35 on which the part W is mounted (Step S103).

Next, as shown in Process P101 of FIG. 10, the worker operates the push button switch 203, with the lifter 35 raised (Step S10), as described in detail with reference to FIG. 7, and installs the part W in the car body B while adjusting the position of the part W (Step S104).

After finishing the installation of the part W, the worker pushes the work completion button 204 (Step S105).

Next, the part installation machine 10 lowers the lifter 35 on which no part W is mounted, based on the signal from the work completion button 204, as shown in Process P102 of FIG. 10 (Step S11).

Next, the part installation machine 10 lowers the cramp 50, thereby ending the synchronized movements of the mounting carriage 30 and the hanger H (Step S12).

During the synchronized movements of the mounting carriage 30 and the hanger H, the AGV 20 travels in the non-drive coupling state, while maintaining the relative position between the AGV 20 and the mounting carriage 30 in a predetermined range (Step S13).

Once the above synchronized movements end, the AGV 20 pulls the mounting carriage 30 close to itself, using the coupling portion 40, and couples the coupling portion 40 again to travel in the drive coupling state, as shown in Process P103 of FIG. 10 (Step S14).

Next, the part installation machine 10 stops at the stop position V and stays there, as shown in Process P104 of FIG. 10 (Step S15).

Lastly, the part installation machine 10 detects whether or not another part installation machine 10 which precedes is making a stop at the stop position I on the downstream side, based on the input signal from the machine detection sensor 205. If another part installation machine 10 is not making a stop, the part installation machine 10 automatically starts moving forward to the stop position I (Step S16).

The above Steps S1-S16 and S101-S105 are repeated by a plurality of part installation machines 10. This allows for properly installing the rear suspension mechanisms W in the car bodies B sequentially transported by a plurality of hangers H.

In this manner, according to the present embodiment, the load applied to the hanger H can be reduced while ensuring the desired synchronization accuracy with the hanger H which transports the car body B. Further, the AGV 20 and the mounting carriage 30 are positioned relative to each other such that they are kept at a relatively short distance from each other. Thus, the AGV 20 and the mounting carriage 30 do not interfere with the car body B which precedes.

Further, according to the present embodiment, the time for separating the AGV 20 and the mounting carriage 30 from each other and recoupling the AGV 20 and the mounting carriage 30 to each other is shortened. This reduces the transfer takt time in the mass production line, and the productivity can therefore be increased.

Further, according to the present embodiment, not only the mounting carriage 30, but also the AGV 20 can travel under the car body B in synchronization with the hanger H. This allows for providing, between the part installation machines 10 for installing parts W in the car bodies B arranged next to each other in the transfer direction, a sufficient empty space through which the worker can move to the opposite side of the car body B with respect to the transfer direction. The efficiency of installation by workers is therefore improved.

The techniques disclosed herein are not limited to the exemplified embodiments, and of course, various modifications and design changes may be made without departing from the scope of the techniques.

For example, according to the present embodiment, the AGV 20 and the mounting carriage 30 are coupled to each other with the Zip Chain 41, but the techniques are not limited thereto. For example, a mechanism capable of controlling stroke lengths, such as a pneumatic or hydraulic cylinder and a rack and pinion, etc., may be used to couple the AGV 20 and the mounting carriage 30. When the coupling portion 40 is comprised of another mechanism, a separated state of the coupling portion 40 is not limited to the non-drive coupling state, but may be a state in which the AGV 20 and the mounting carriage 30 are completely disconnected, as long as the coupling portion 40 can smoothly transition from the separated state to the coupled state.

Further, according to the present embodiment, the rear suspension mechanisms are installed in the car bodies B as the parts W, depending on car models, but the parts W are not limited thereto. Examples of the parts W may include a power unit comprised of an engine, a transmission, etc. Moreover, the installation target body and the parts are not limited to those related to vehicles.

Further, according to the present embodiment, the AGV 20 tows the mounting carriage 30, but the techniques are not limited thereto. For example, the AGV 20 may push the mounting carriage 30.

Further, according to the present embodiment, the AGV 20 travels along the single looped travel line laid on the floor, but the techniques are not limited thereto. For example, a looped travel line having a short cut or a bypass may be provided, and the AGV 20 may travel while choosing either the short cut or the bypass, depending on the length of time for the installation. Moreover, according to the present embodiment, the AGV 20 is a rail-guided vehicle traveling along the travel line laid on the floor, but the AGV 20 is not limited thereto. For example, the AGV 20 may be a so-called trackless vehicle.

Further, according to the present embodiment, the part W has been installed in the installation target body from below, but the technique is not limited thereto. For example, the part W such as a door may be installed in the car body B as an installation target body, from a lateral side, or the part W such as a window glass may be installed in the car body B as the installation target body from above.

INDUSTRIAL APPLICABILITY

As described above, the techniques disclosed herein allow for reducing a load applied to a transfer system transferring an installation target body, while ensuring desired accuracy in synchronization with the transfer system. Thus, the techniques disclosed herein may be suitably used in the field of industrial production of, for example, vehicles.

DESCRIPTION OF REFERENCE CHARACTERS

10 Part Installation Machine
20 AGV (Drive Carriage Section)
30 Mounting Carriage (Part Mounting Carriage Section)
35 Lifter (Part Lift Mechanism)
40 Coupling Portion (Separation/Coupling Device)
50 Hanger Cramp (Engagement Device)
100 Control Unit (Control Device)
341-344 Relative Position Detection Sensor (Relative Position Detection Device)
W Rear Suspension Mechanism (Part)

H Hanger (Suspension Section)
L Travel Rail (Movement Path)
B Car Body (Installation Target Body)
R Travel Line (Travel Path)
I Stop Position (Part Mounting Area)
IV Part Installation Work Area

The invention claimed is:

1. A self-propelled part installation machine on which a part is mounted in a part mounting area, and which travels while matching with a movement path of a transfer system in a part installation work area located downstream of the part mounting area, and is capable of installing the part in an installation target body transferred by the transfer system,
the part installation machine including a drive carriage section capable of traveling along a given travel path, a part mounting carriage section on which the part is mounted, and a coupling device which brings the drive carriage section and the part mounting carriage section into a coupled state, wherein
the drive carriage section is capable of transporting the part mounting carriage section, with the drive carriage section and the part mounting carriage section brought into the coupled state by the coupling device,
the coupling device is configured to bring the drive carriage section and the part mounting carriage section into a driving force separated state in which a driving force of the drive carriage section is not transmitted to the part mounting carriage section,
the part mounting carriage section is provided with an engagement device which engages the part mounting carriage section with the transfer system in the part installation work area,
the drive carriage section is provided with a relative position detection device which detects a relative position between the drive carriage section and the part mounting carriage section in a travelling direction when the part mounting carriage section is in the separated state, and
the part installation machine is provided with a control device which, when the part installation machine enters the part installation work area, operates the coupling device to bring the drive carriage section and the part mounting carriage section from the coupled state into the separated state, and operates the engagement device so that the part mounting carriage section is engaged with the transfer system and is transported by the transfer system, and in this state, the control device controls a travelling speed of the drive carriage section such that the relative position detected by the relative position detection device is maintained within a predetermined range.

2. The part installation machine of claim 1, wherein
the coupled state is a drive coupling state in which the drive carriage section and the part mounting carriage section are coupled to each other so that the drive carriage section and the part mounting carriage section travel in an integral manner using a driving force of the drive carriage section, and
the driving force separated state is a non-drive coupling state in which the drive carriage section and the part mounting carriage section are coupled to each other in a manner that does not transmit the driving force of the drive carriage section to the part mounting carriage section.

3. The part installation machine of claim 2, wherein
the travel path is a looped path, and
after recoupling of the drive carriage section and the part mounting carriage section by the coupling device, the part installation machine is carried into the part mounting area again.

4. The part installation machine of claim 3, wherein
the transfer system has, in the part mounting area, a plurality of suspension sections each of which hangs the installation target body, and
the part installation machine has a part lift mechanism which lifts the part from under the installation target body hanging from the suspension section to install the part in the installation target body.

5. The part installation machine of claim 4, wherein
in the case where the part is installed in a rear portion, in a transfer direction, of the installation target body, the drive carriage section transports the part mounting carriage section by towing a front side, in the transfer direction, of the part mounting carriage section, and
in the case where the part is installed in a front portion, in the transfer direction, of the installation target body, the drive carriage section transports the part mounting carriage section by pushing a rear side, in the transfer direction, of the part mounting carriage section.

6. The part installation machine of claim 2, wherein
the transfer system has, in the part mounting area, a plurality of suspension sections each of which hangs the installation target body, and
the part installation machine has a part lift mechanism which lifts the part from under the installation target body hanging from the suspension section to install the part in the installation target body.

7. The part installation machine of claim 6, wherein
in the case where the part is installed in a rear portion, in a transfer direction, of the installation target body, the drive carriage section transports the part mounting carriage section by towing a front side, in the transfer direction, of the part mounting carriage section, and
in the case where the part is installed in a front portion, in the transfer direction, of the installation target body, the drive carriage section transports the part mounting carriage section by pushing a rear side, in the transfer direction, of the part mounting carriage section.

8. The part installation machine of claim 1, wherein
the travel path is a looped path, and
after recoupling of the drive carriage section and the part mounting carriage section by the coupling device, the part installation machine is carried into the part mounting area again.

9. The part installation machine of claim 8, wherein
the transfer system has, in the part mounting area, a plurality of suspension sections each of which hangs the installation target body, and
the part installation machine has a part lift mechanism which lifts the part from under the installation target body hanging from the suspension section to install the part in the installation target body.

10. The part installation machine of claim 9, wherein
in the case where the part is installed in a rear portion, in a transfer direction, of the installation target body, the drive carriage section transports the part mounting carriage section by towing a front side, in the transfer direction, of the part mounting carriage section, and
in the case where the part is installed in a front portion, in the transfer direction, of the installation target body, the drive carriage section transports the part mounting carriage section by pushing a rear side, in the transfer direction, of the part mounting carriage section.

11. The part installation machine of claim 1, wherein
the transfer system has, in the part mounting area, a plurality of suspension sections each of which hangs the installation target body, and
the part installation machine has a part lift mechanism which lifts the part from under the installation target body hanging from the suspension section to install the part in the installation target body.

12. The part installation machine of claim 11, wherein
in the case where the part is installed in a rear portion, in a transfer direction, of the installation target body, the drive carriage section transports the part mounting carriage section by towing a front side, in the transfer direction, of the part mounting carriage section, and
in the case where the part is installed in a front portion, in the transfer direction, of the installation target body, the drive carriage section transports the part mounting carriage section by pushing a rear side, in the transfer direction, of the part mounting carriage section.

\* \* \* \* \*